(12) United States Patent
Mukherjee et al.

(10) Patent No.: US 12,282,711 B2
(45) Date of Patent: Apr. 22, 2025

(54) SYSTEM AND METHOD FOR MODELING PLANT SYSTEMS UTILIZING SCALABLE AND REPEATABLE MODULES

(71) Applicant: GENERAL ELECTRIC COMPANY, Schenectady, NY (US)

(72) Inventors: Shubha Sankar Mukherjee, Faridabad (IN); Borislav Dokic, Nussbaumen (CH); Prashant Agrawal, Wettingen (CH); Alessandro Sgambati, Moehlin (CH); Martin Laesser, Oberweningen (CH)

(73) Assignee: GE Infrastructure Technology LLC, Greenville, SC (US)

(*) Notice: Subject to any disclaimer, the term of this patent is extended or adjusted under 35 U.S.C. 154(b) by 988 days.

(21) Appl. No.: 17/194,596

(22) Filed: Mar. 8, 2021

(65) Prior Publication Data
US 2022/0284145 A1    Sep. 8, 2022

(51) Int. Cl.
*G06F 30/13* (2020.01)
*G06F 30/17* (2020.01)
(Continued)

(52) U.S. Cl.
CPC .............. *G06F 30/13* (2020.01); *G06F 30/17* (2020.01); *G06F 2111/20* (2020.01); *G06F 2113/14* (2020.01)

(58) Field of Classification Search
CPC ...................................................... G06F 30/13
See application file for complete search history.

(56) References Cited

U.S. PATENT DOCUMENTS 10,754,999 B1 *   8/2020  Vratimos ................ F24S 90/00
2003/0216893 A1 * 11/2003  Hendrickson ........... G06F 30/13
                                                                703/1
(Continued)

FOREIGN PATENT DOCUMENTS

WO      2005114495        12/2005
WO   WO-2005114495 A1 *   12/2005    ......... G06F 17/5004

OTHER PUBLICATIONS

EP Application No. 22157446 Search Report dated Aug. 1, 2022, 8 pgs.

*Primary Examiner* — Vincent H Tran
(74) *Attorney, Agent, or Firm* — Fletcher Yoder, P.C.

(57) ABSTRACT

A modeling system for a plant system of a power plant is provided. The modeling system enables receiving a selection of one or more pre-engineered sub-modules for a plant system module, wherein each pre-engineered sub-module is configured to be scalable over a defined range both for an entire class product range and each potential power plant configuration, and each pre-engineered sub-module is parametrized within the defined range with a pre-defined parametric relationship. The modeling system enables receiving values for one or more variables for the defined range for the one or more pre-engineered sub-modules. The modeling system enables generating a pre-engineered and parametrized sub-module model for each of the one or more pre-engineered sub-modules based on the values for the variables and generating a plant system module model from the pre-engineered and parametrized sub-module models by assembling the pre-engineered and parametrized sub-module models together according to pre-defined rules.

20 Claims, 10 Drawing Sheets

(51) Int. Cl.
*G06F 111/20* (2020.01)
*G06F 113/14* (2020.01)

(56) References Cited

U.S. PATENT DOCUMENTS

| | | | | |
|---|---|---|---|---|
| 2005/0171748 | A1* | 8/2005 | Oke | G06F 30/13 |
| | | | | 703/6 |
| 2007/0168174 | A1* | 7/2007 | Davari | G06F 30/00 |
| | | | | 703/6 |
| 2011/0098985 | A1* | 4/2011 | Lawson | G06F 30/13 |
| | | | | 703/1 |
| 2016/0299999 | A1* | 10/2016 | James | G06F 30/20 |
| 2017/0293418 | A1* | 10/2017 | Hams | G05B 19/418 |
| 2019/0197198 | A1* | 6/2019 | Cheong | G06F 30/15 |
| 2019/0228112 | A1* | 7/2019 | Son | G06F 30/00 |
| 2019/0311087 | A1* | 10/2019 | Jackson | G06F 30/15 |
| 2019/0354075 | A1* | 11/2019 | Christiansen | G05B 15/02 |
| 2020/0380192 | A1* | 12/2020 | MacRae | G06F 30/347 |
| 2021/0096524 | A1* | 4/2021 | Stump | G05B 19/0426 |
| 2021/0141985 | A1* | 5/2021 | Fischer | G06F 30/13 |
| 2022/0058306 | A1* | 2/2022 | Mabote | G06F 30/18 |
| 2022/0075918 | A1* | 3/2022 | McGregor | G06F 30/28 |
| 2022/0129138 | A1* | 4/2022 | List | G06F 3/0482 |
| 2023/0029904 | A1* | 2/2023 | Mettenleiter | G05B 17/02 |
| 2023/0367921 | A1* | 11/2023 | Williams | G06F 30/23 |

* cited by examiner

SYSTEM AND METHOD FOR MODELING PLANT SYSTEMS UTILIZING SCALABLE AND REPEATABLE MODULES

BACKGROUND

The subject matter disclosed herein relates to power plants and, more particularly, to a system and method for designing and modeling plant systems utilizing parametrized, scalable and repeatable modules.

Power plants may utilize multiple different systems that are interconnected and disposed throughout a particular location. Each location where a power plant is located may have unique considerations to accommodate when compared to other locations that will affect how a particular power plant is arranged and constructed (in particular, the individual plant systems that form the power plant). Individually designing each power plant (and its systems) utilizes a large amount of time, effort, and expense.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the subject matter. Indeed, the subject matter may encompass a variety of forms that may be similar to or different from the embodiments set forth below.

In accordance with a first embodiment, a modeling system for a plant system of a power plant is provided. The modeling system includes one or more hardware processors. The modeling system also includes a non-transitory memory, the non-transitory memory storing instructions that, when executed by the one or more hardware processors, causes the one or more hardware processors to perform actions. The actions include receiving a selection of one or more pre-engineered sub-modules from a plurality of pre-engineered sub-modules for a plant system module, wherein each pre-engineered sub-module is configured to be scalable over a defined range both for an entire class product range and each potential power plant configuration, and each pre-engineered sub-module is parametrized within the defined range with a pre-defined parametric relationship. The actions also include receiving values for one or more variables for the defined range for the one or more pre-engineered sub-modules. The actions further include generating a pre-engineered and parametrized sub-module model for each of the one or more pre-engineered sub-modules based on the values for the one or more variables. The actions even further include generating a plant system module model from the pre-engineered and parametrized sub-module models by assembling the pre-engineered and parametrized sub-module models together according to pre-defined rules.

In accordance with a second embodiment, a method for modeling a plant system module of a power plant is provided. The method includes receiving, at a processor, a selection of one or more pre-engineered sub-modules from a plurality of pre-engineered sub-modules for a plant system module, wherein each pre-engineered sub-module is configured to be scalable over a defined range both for an entire class product range and each potential power plant configuration, and each pre-engineered sub-module is parametrized within the defined range with a pre-defined parametric relationship. The method also includes receiving, at the processor, values for one or more variables for the defined range for the one or more pre-engineered sub-modules. The method further includes generating, via the processor, a pre-engineered and parametrized sub-module model for each of the one or more pre-engineered sub-modules based on the values for the one or more variables. The method even further includes generating, via the processor, a plant system module model from the pre-engineered and parametrized sub-module models by assembling the pre-engineered and parametrized sub-module models together according to pre-defined rules.

In accordance with a third embodiment, a non-transitory computer-readable medium is provided. The computer-readable medium includes processor-executable code that, when executed by a processor, causes the processor to perform actions. The actions include receiving a selection of one or more pre-engineered sub-modules from a plurality of pre-engineered sub-modules for a plant system module, wherein each pre-engineered sub-module is configured to be scalable over a defined range both for an entire class product range and each potential power plant configuration, and each pre-engineered sub-module is parametrized within the defined range with a pre-defined parametric relationship. The actions also include receiving values for one or more variables for the defined range for the one or more pre-engineered sub-modules. The actions further include generating a pre-engineered and parametrized sub-module model for each of the one or more pre-engineered sub-modules based on the values for the one or more variables. The actions even further include generating a plant system module model from the pre-engineered and parametrized sub-module models by assembling the pre-engineered and parametrized sub-module models together according to pre-defined rules.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments of the present subject matter will be described below. In an effort to provide a concise description of these embodiments, all features of an actual implementation may not be described in the specification. It should be appreciated that in the development of any such actual implementation, as in any engineering project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of fabrication, and manufacture for those of ordinary skill having the benefit of this disclosure.

When introducing elements of various embodiments of the present subject matter, the articles "a," "an," "the," and "said" are intended to mean that there are one or more of the elements. The terms "comprising," "including," and "having" are intended to be inclusive and mean that there may be additional elements other than the listed elements.

In general, pre-assembly or modularization of part of the plant, either for a particular area or a plant system has advantage in terms of cost, schedule, safety and quality compared to stick-built (i.e., built piece by piece). Hence, it is a continuous endeavor to explore the highest possible extent to which a power plant can be modularized. While modularization on a project level benefits the specific project, standardizing the modules with a robust design that is repeatable across different projects brings in additional cost, schedule and quality benefits with volume and scale. However, the uniqueness of each plant in terms of systems design, performance requirements, and geographical (location-specific) constraints, such as seismic conditions and varying footprint constraints, poses a challenge for the concept of repeatable plant module design, since there are too many variables to manage in a single solution.

The present disclosure is directed toward systems and methods for designing and modeling an area or plant system (e.g., plant system module) for a power plant. In particular, the disclosed techniques break down the plant system that needs to be modularized (e.g., atmospheric drain vessel (ADV) system) into smaller sub-parts, and each sub-part (or sub-module) is modeled or engineered for a range of variables that is expected in the system, e.g., number of steam drain connections, size of drain headers, or other such variables. Such sub-modules are parametrized with respect to those range of variables with a pre-defined parametric relationship. Such range or boundary conditions are selected in a way that reasonably covers all expected data variations across a class of products with a wide range of plant configurations (e.g., single shaft and multi-shaft with 1, 2 or 3 heat recovery steam generators). These sub-modules may be modeled for a specific project by selecting the applicable variables from the defined range, and a fully pre-engineered and ready to manufacture module model is generated with minimum project-specific engineering effort.

Also, as per the specific project requirement, one or more pre-engineered sub-modules could be used and arranged relative to each other to suit the specific project requirements, layout, etc., based on pre-defined rules (e.g., pre-defined naming convention and/or pre-defined orientation convention). The concept is similar to first selecting one or more "brick" or "building block" designs (e.g., the pre-engineered sub-modules) and then using a number of such "building blocks" and arranging them to make the whole module (e.g., plant system module), such as the ADV system module. Each sub-module in its largest form, i.e., when selected for the extreme ceiling values within the defined range, is configured to fit wholly within standard road-transportable cargo limits. In addition, the disclosed systems for development of the modules are configured to eliminate the use of special components in the hardware configuration of the module and to ensure that all selected components are readily available. The disclosed systems and methods provide the benefits of project-specific modularization (e.g., improved cost competitiveness through standardization, schedule advantage, and reduction in health, safety, and quality risks) with the benefit of a robust and proven model that results in reduced engineering effort, fewer quality issues, and less rework.

Figure 1:
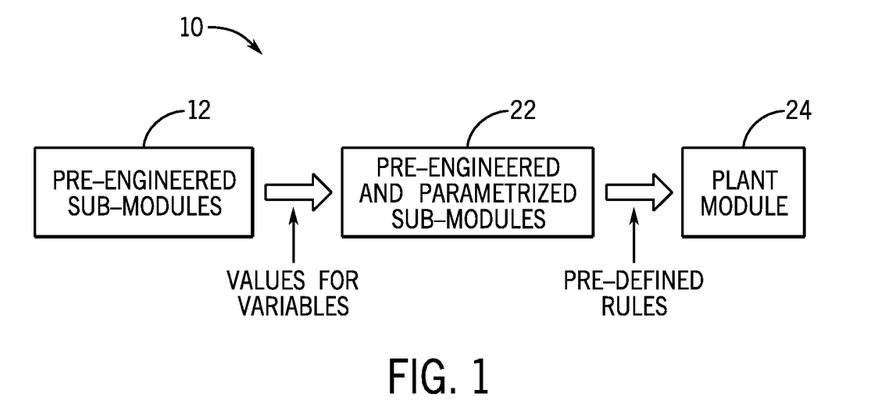
FIG. 1 is a schematic diagram of an embodiment of a modeling system for modeling components for an area or plant system of a power plant, in accordance with aspects of the present disclosure.

With the foregoing in mind, FIG. 1 is a schematic diagram of an embodiment of a modeling system 10 for modeling components for an area or plant system of a power plant. The modeling system 10 may be implemented (e.g., as a modeling program) on one or more computing systems (e.g., as described in FIG. 15). The modeling system 10 may be utilized for any area or plant system that is able to be modularized in a power plant. In the following discussion, the ADV system or the ADV clean drain system is utilized as an example. In particular, the ADV system may include an ADV vessel along with connected large bore drain headers with small bore connections, motorized and manual valves, and drain pumps formed into a single module package. Specifically, the ADV system may include an ADV system module formed from a number of sub-modules (e.g., ADV tank sub-module, three drain header sub-modules (e.g., high pressure (HP), intermediate pressure (IP), and low pressure (LP)), and a pump sub-module).

The modeling system 10 utilizes a "building block" approach in the modularization of components for an area or plant system of a power plant. The modeling system 10 includes a finite number pre-engineered sub-modules 12 (e.g., ADV tank sub-module, HP, LP, and IP drain header sub-modules, pump sub-module) that form a component or sub-system of a power plant module or system (e.g., ADV module). Each pre-engineered sub-module 12 is scalable via parametrization for a range of variables (e.g., number of steam drain connections, size of drain header, etc.) expected in the system (e.g., ADV system). The pre-engineered sub-modules 12 are parametrized with respect to the range of variables with a pre-defined parametric relationship. The range or boundary conditions (e.g., maximum and/or minimum limits) are selected in a way that reasonably includes all expected data variations across a given class of products and takes into account a wide range of plant configurations (e.g., single shaft and multi-shaft with 1, 2, or 3 HRSGs). In other words, the sub-modules are pre-engineered as a family of designs within a specified range or boundary condition (maximum and minimum values for each variable attribute). The parametric modeling feature effectively handles any parameter within this range. Each sub-module 12 may be directly utilized for lower capacity projects as well.

Each sub-module 12 is pre-engineered to be physically scalable by parametrization. The sub-module 12 may grow or shrink in size per the variations in key process and arrangement parameters that are expected due to external factors. The pre-engineered sub-modules 12 could be modeled for a specific project via inputting or selecting the applicable values for the variables from the defined range which results in the generation of a fully pre-engineered model that is ready to be manufactured with minimum project-specific engineering effort. Each pre-engineered sub-module 12 is fully repeatable across multiple projects due to it being parametrized with project-specific process parameters and other geographical constraints.

Each pre-engineered sub-module 12 (even when the highest values within the defined range are selected) is configured for road transportation when built and fits 100 percent within standard road-transportable cargo limits. As described in greater detail below, certain pre-engineered sub-modules 12 will be configured or modeled to have all piping (e.g., for terminal points) to be fully anchored at an outer module boundary so that the pre-engineered sub-module 12 is isolated and independent of outside influence (which enables standardization). In certain embodiments, a free terminal point option may also be provided for certain pre-engineered sub-modules to provide additional flexibility for installation.

Returning to the scalability of the pre-engineered sub-modules 12, the scalability is achieved through a pre-defined parametric relationship with variable attributes or variables. A certain number of attributes or variables are identified or designated as independent attributes ($x_i$) or variables, which vary widely depending on the product range, plant configurations, and other project/contract specific conditions that have an impact on the design and arrangement of the sub-module (e.g., pressure, temperature, site conditions, etc.). In addition, a certain number of attributes are identified or designated as derived or dependent attributes ($y_i$) or variables that define the overall design and arrangement of the sub-module (e.g., sub-module length, width, height, pipe and insulation thickness, etc.).

The relationship between the dependent ($y_i$) and independent ($x_i$) attributes may take many forms. For example, the dependent ($y_i$) and independent ($x_i$) attributes may be in the form of a continuation function (e.g., $y_i=f(x_1, x_2, \ldots, x_i)$). As a specific example for the ADV system, an overall length of the sub-module ($y_1$) may be a continuous type function of the drain pipe and header insulation thicknesses ($x_1$, $x_2$), personnel access width ($x_3$), selected steel profile ($x_4$), number of drain nozzles connected to the drain header ($x_5$), etc. The overall width of the sub-module ($y_2$) may also be a continuous function of the selected steel profile ($x_4$), drain header size ($x_5$), and drain pipe and drain header insulation thicknesses ($x_1$, $x_2$), etc.

In another example, a dependent attribute ($y_i$) may have a discrete and unique value for a set of independent attributes ($x_1, x_2, \ldots, x_i$). As a specific example for the ADV system, an outer diameter of pipe ($y_1$) is a function of the nominal diameter input ($x_1$), but each $y_1$ has a discrete and unique value for each $x_1$ defined by codes (e.g., ASME B36.10 or B36.19). For example, the pre-calculated results of pipe stress analysis for a range of seismic factors are stored as dependent attributes. (For example, one result for a lower seismic zone has a seismic factor up to 0.3 g, where g is the acceleration due to gravity, and so on for higher factors in steps). Based on the project-specific seismic value, the pre-calculated stress results may be directly used with minimum project-specific engineering effort. For example, for a site with a seismic factor of 0.24 g, results from the analysis with a factor up to 0.3 g will be used. This is an example of a unique output for a range of input variables (in this case, the range of seismic factor).

In a further example, the dependent ($y_i$) and independent ($x_i$) attributes may be in the form of a step function (e.g., $y_i$ has a constant value for a certain range of values of $x_i$ (i=1 to n)). As a specific example for the ADV system, an insulation thickness of the pipe ($y_i$) may be a function of the design temperature ($x_1$) and the pipe size ($x_2$) in the form of a step function (with the insulation thickness pre-calculated and picked from a matrix table containing a design temperature and pipe size as inputs).

For independent attributes ($x_i$) that do not vary widely or that do not have much cost implication even if a sufficiently conservative value is chosen to cover the whole range, a fixed conservative value of the corresponding dependent attribute ($y_i$) is utilized. For example, in the ADV system, diameter of the small bore drain pipes may vary from DN25 to DN50 across all types of plant configurations and product ranges. Thus, the sub-module configuration will be done with higher value of DN50 size only. This simplifies the design by minimizing variables without having a considerable impact on cost due to this bundling.

Figure 2:
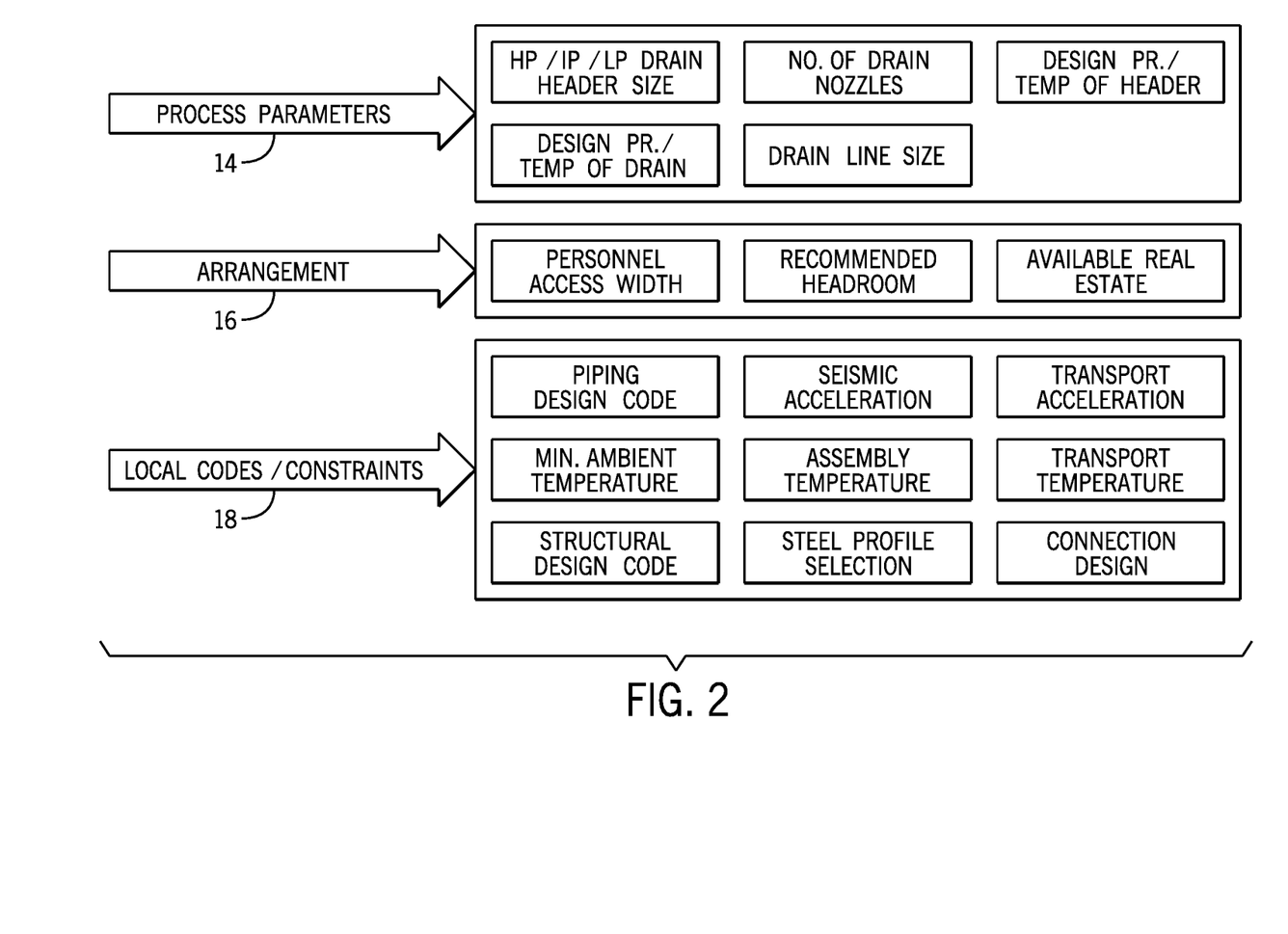
FIG. 2 is a schematic diagram of an embodiment of a variety of attributes (e.g., independent attributes or variables) utilized in the modeling system of FIG. 1, in accordance with aspects of the present disclosure.

FIG. 2 is a schematic diagram of an embodiment of a variety of attributes (e.g., independent attributes or variables) utilized in the modeling system 10. In particular, the attributes are independent variables that may vary widely depending on the product range, plant configurations, and other project/contract/site specific conditions that have an impact on the design and arrangement of the sub-module 12. Specifically, in the illustrated exemplary schematic diagram, the independent variables (e.g., $x_1, x_2, \ldots, x_i$) are for an IP drain header sub-module for an ADV system module. As depicted, the independent variables may fall under a variety of groups (e.g., process parameters 14, arrangement 16, and local codes/constraints 18). FIG. 2 depicts various examples of independent variables within these groups. Other groups may be utilized.

Figure 3:
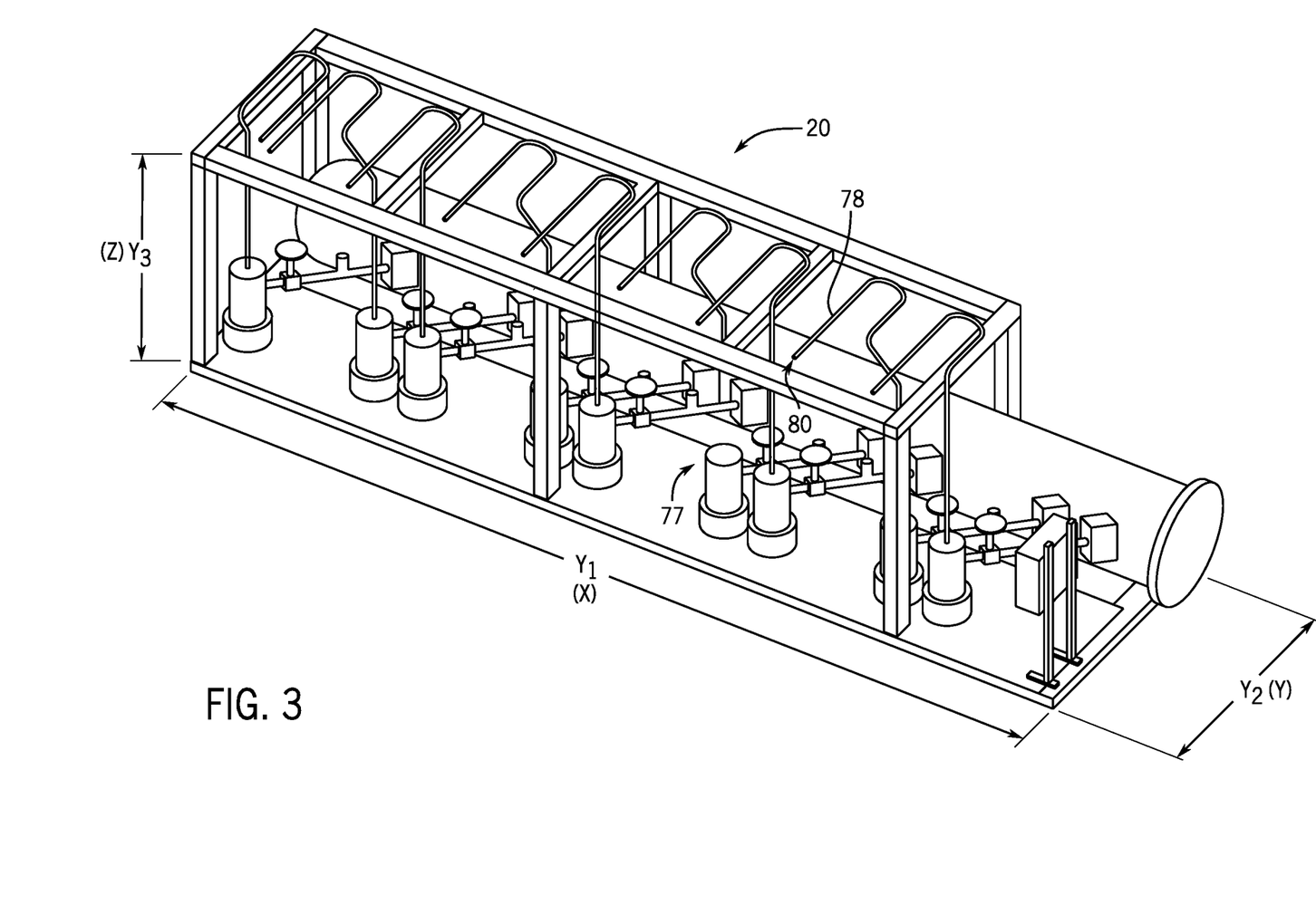
FIG. 3 is a perspective view of an embodiment of a sub-module and related attributes (e.g., dependent attributes or variables) utilized in the modeling system of FIG. 1, in accordance with aspects of the present disclosure.
Figure 4:
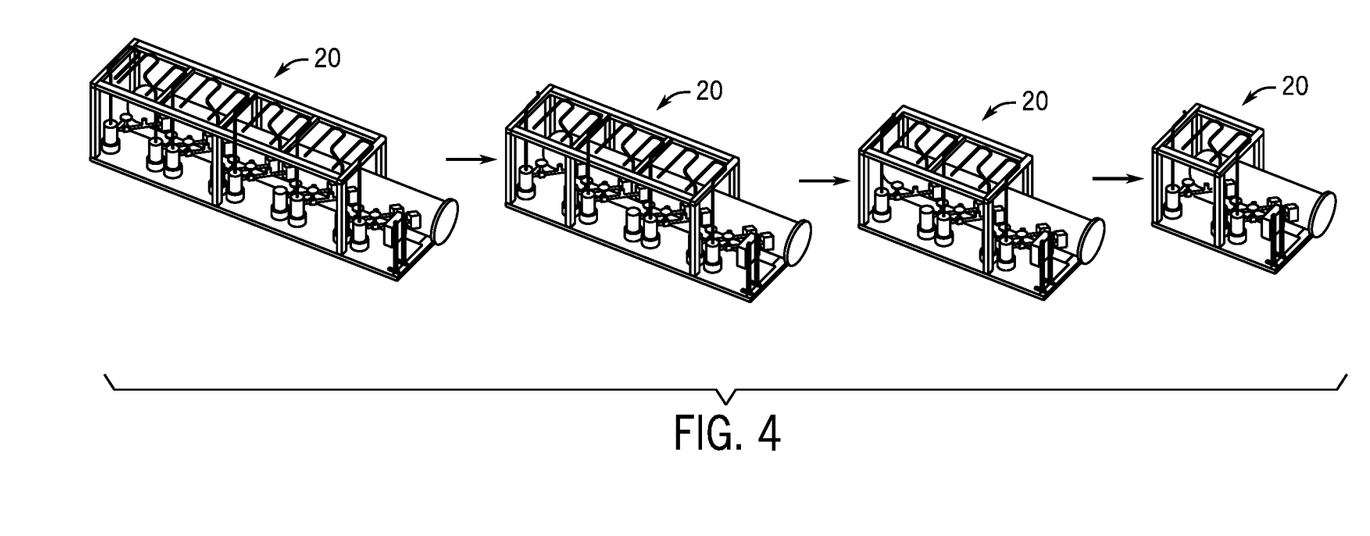
FIG. 4 is a schematic diagram illustrating scalability via parametrization of a sub-module, in accordance with aspects of the present disclosure.

FIG. 3 is a perspective view of an embodiment of a sub-module and related attributes (e.g., dependent attributes or variables) utilized in the modeling system 10. In particular, the attributes are dependent variables that define the overall arrangement of the sub-module 12. Specifically, in the illustrated exemplary embodiment, the dependent variables are for an IP drain header sub-module 20 for an ADV system module. Dimensions in the x-direction ($y_1$=X), the y-direction ($y_2$=Y), and the z-direction ($y_3$=Z) are depicted for the IP drain header sub-module 20 in FIG. 2. FIG. 4 illustrates how the IP drain header sub-module 20 is scalable via parametrization utilizing the variables in FIGS. 2 and 3.

In summary, returning to FIG. 1, some of the attributes ($x_i$) may be variable and need to be inputted by a user of the modeling system 10 while other attributes ($x_i$) may be hard coded. Further, attributes ($y_i$) may be derived from special rules (e.g. formulae/step functions) from the variable (user input) or hard-coded attributes ($x_i$). In either case, the attributes $y_i$ are a function of one or more $x_i$. Since $y_i$ is a function of one or more $x_i$, the generation of pre-engineered and parametrized sub-modules may be fully or partially automated based on the pre-defined set of functions.

Upon receiving the values for the attributes (e.g., for the independent attributes $x_i$), the modeling system 10 generates (e.g., automatically or semi-automatically) one or more pre-engineered and parametrized sub-modules 22 (e.g., pre-engineered and parametrized sub-module models or final sub-module models). "Automatically" means once the values are received for the attributes (e.g., for the independent attributes $x_i$), the modeling system 10 generates the pre-engineered and parametrized sub-modules 22 without further input from a user. In certain embodiments, the modeling system 10 may be utilized manually for the generation of the sub-modules 22. In certain embodiments, whenever a pre-engineered and parametrized sub-module 22 crosses a road-transportable maximum envelop threshold for a given set of independent attributes or variables, the modeling system 10 (e.g., automatically or semi-automatically) may select an additional sub-module of the same or different type to be connected serially with the first sub-module 22.

Figure 5:
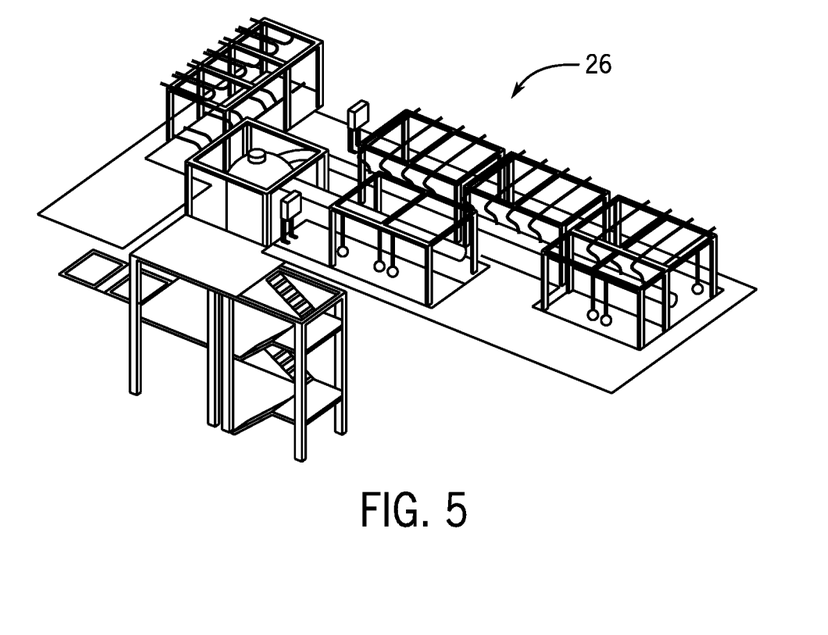
FIG. 5 is a perspective view of an embodiment of a plant module generated by the modeling system of FIG. 1, in accordance with aspects of the present disclosure.
Figure 6:
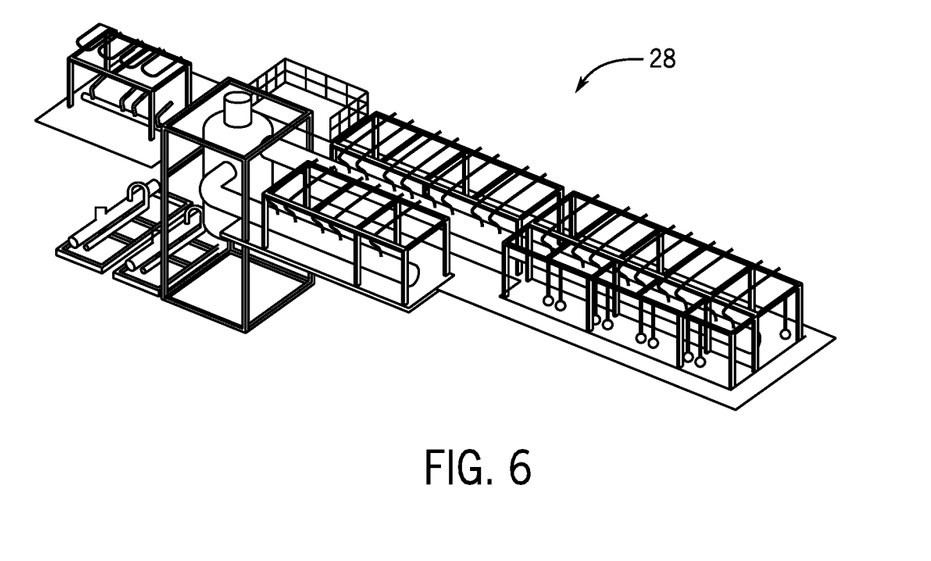
FIG. 6 is a perspective view of an embodiment of another plant module generated by the modeling system of FIG. 1, in accordance with aspects of the present disclosure.

The different pre-engineered and parametrized sub-modules or final sub-module models 22 are compatible with each other and can be grouped together in a large number of combinations. In cases where more than one pre-engineered and parametrized sub-modules 22 is utilized, the modeling system 10 arranges the pre-engineered and parametrized sub-modules 22 to generate (automatically or semi-automatically) a plant module 24 (e.g., plant module model) in accordance with pre-defined rules to meet specific project/contract/site requirements. As mentioned above, "automatically" means the modeling system 10 generates the plant module 24 without further input from a user. In certain embodiments, the modeling system 10 may be utilized manually for the generation of the plant module 24. FIGS. 5 and 6 illustrate examples of different plant modules 24 (e.g., ADV system modules 26 and 28, respectively) generated by the modeling system 10 from the pre-engineered and parametrized sub-modules 22.

The utilization of a pre-defined set of rules for arrangement provides a highly repeatable modeling solution across different projects. The pre-defined rules may be a pre-defined naming convention and/or a pre-defined orientation convention. Thus, the relative arrangement of the pre-engineered and parametrized sub-modules 22 is not random. The pre-defined naming convention and the pre-defined orientation convention provide a systematic relative arrangement guide with a finite but large enough number of possible combinations that reasonably meet the requirements of all product and plant configurations.

Figure 7:
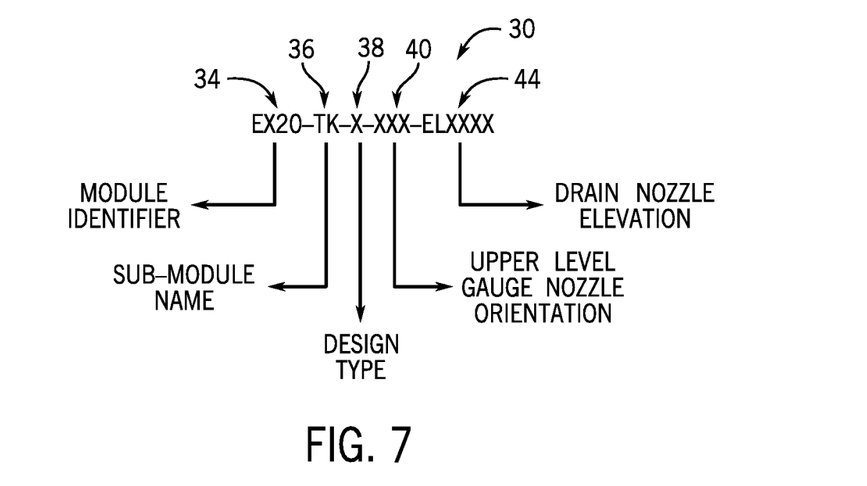
FIG. 7 is a schematic diagram of an embodiment of a pre-defined naming convention (pre-defined rules) for a sub-module (e.g., atmospheric drain vessel (ADV) tank) of a plant module (e.g., ADV system module), in accordance with aspects of the present disclosure.
Figure 8:
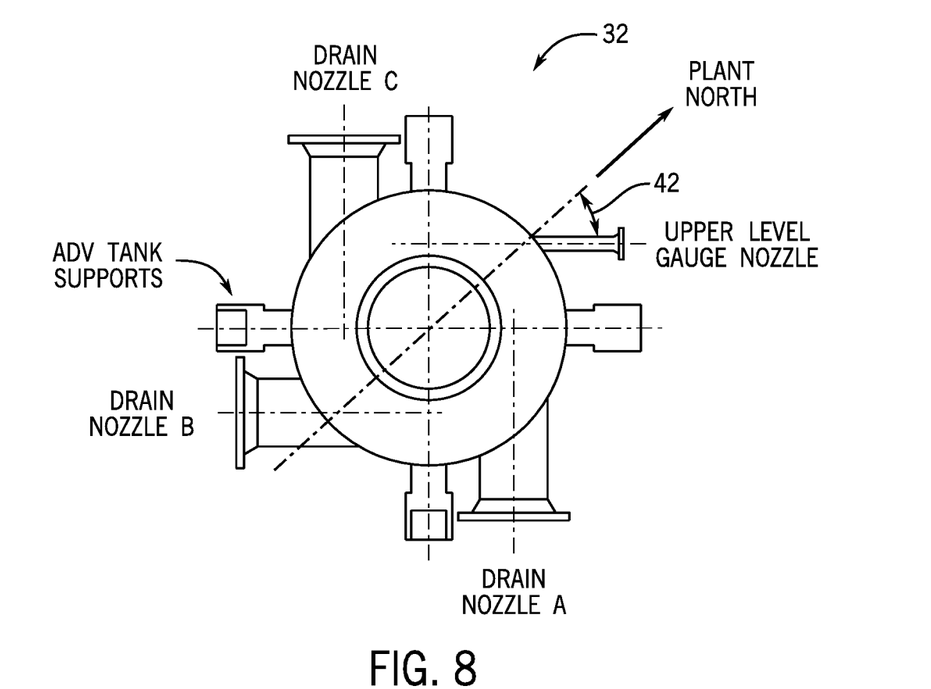
FIG. 8 is a plan view of an embodiment of a sub-module (e.g., ADV tank), in accordance with aspects of the present disclosure.

FIG. 7 is a schematic diagram of an embodiment of a pre-defined naming convention 30 for an ADV tank sub-module 32 (depicted in FIG. 8). The various Xs are the variables that define the relative orientation and elevation of the ADV tank with respect to the plant. Once these are defined, the ADV tank sub-module may be placed at the proper location. The pre-defined naming convention 30 includes an alphanumeric module identifier 34 that defines the plant module (e.g., EX20 for the ADV system module). The pre-defined naming convention 30 also includes a sub-module name 36 (e.g., TK for the tank of the ADV tank sub-module 32 in FIG. 8). The pre-defined naming convention 30 further includes a design type 38. In certain embodiments, the design type 38 for the ADV tank sub-module 32 is "S" for stick-built with loose supplied prefabricated level gauge piping. In other embodiments, the design type 38 for the ADV tank sub-module 32 is "1" for a modularized tank with supporting structure and loose supplied prefabricated level gauge piping.

The pre-defined naming convention 30 even further includes an upper level gauge nozzle orientation 40 with respect to the Plant North (as depicted by an arrow in FIG. 8). The upper level gauge nozzle orientation 40 may be represented in degrees (e.g., 90 degrees, 135 degrees, etc.) as angle 42 relative to Plant North. This determines the orientation of the whole ADV system module. As depicted in FIG. 8, the three steam drain inlet nozzles may be named A, B, and C located clockwise from the upper level gauge nozzle at 90 degrees apart from each other with nozzle A also located at 90 degrees clockwise from the upper level gauge nozzle.

The pre-defined naming convention 30 still further includes a drain nozzle elevation 44. This is a project specific elevation (e.g., in millimeters) for the drain nozzles (A, B, C) relative to a steam turbine building finished floor level. The drain nozzle elevation 44 will be determined by the lowest elevation of all the small bore drain pipes connected to any of the three headers.

Figure 9:
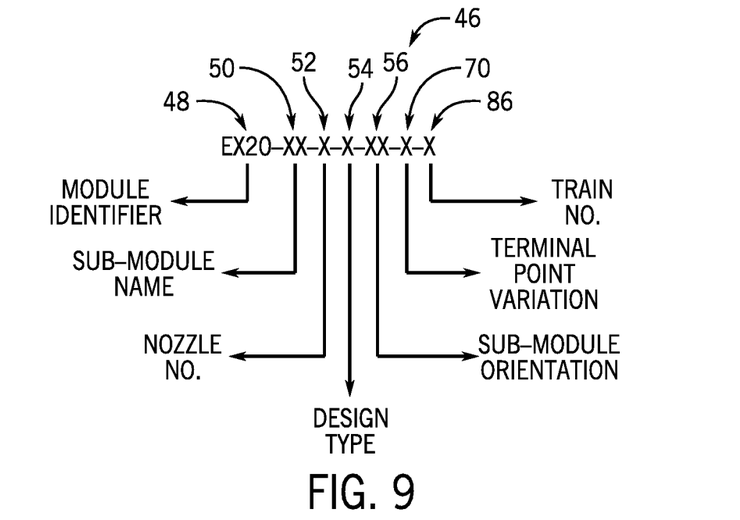
FIG. 9 is a schematic diagram of an embodiment of a pre-defined naming convention (pre-defined rules) for a sub-module (e.g., drain header sub-module) of a plant module (e.g., ADV system module), in accordance with aspects of the present disclosure.

FIG. 9 is a schematic diagram of a pre-defined naming convention 46 for a drain header sub-module (e.g., an HP, IP, or LP drain header sub-module). The drain header modules are coupled to, and oriented relative to, the ADV tank. Once the tank orientation and elevation are defined and the tank is placed at the intended location in a power plant, the following naming convention 46 helps set the drain headers in the most suitable way for the particular project site. The various Xs are the variables that define the module and sub-module selection, nozzle of ADV tank on which it is attached, nozzle design type, relative orientation of the sub-module with respect to the ADV tank, terminal point configuration, and train number. Once these are defined, the drain header modules are placed at the proper location.

The pre-defined naming convention 46 includes an alphanumeric module identifier 48 that defines the plant module (e.g., EX20 for the ADV system module). The pre-defined naming convention 46 also includes a sub-module name 50 (e.g., HP, IP, or LP for the respective HP, IP, and LP steam drain header sub-modules). The pre-defined naming convention 46 further includes a nozzle number 52. As noted above, the steam drain inlet nozzles may be named A, B, and C clockwise from the upper level gauge nozzle. Any of these nozzles may be assigned to any of three drain headers (e.g., HP, IP, or LP drain headers) by a user as per the needs of a specific project and layout. The nozzle number 52 may be designated A, B, or C based on the steam drain inlet nozzle.

The pre-defined naming convention 46 even further includes a design type 54. Different design types (e.g., pre-engineered sub-modules 12 in FIG. 1) may exist that vary based on dimensions, pipe size, header size, number of drains, or other parameters with the types designated as 1, 2, 3, etc. for the design type in the pre-defined naming convention 46.

Figure 10:
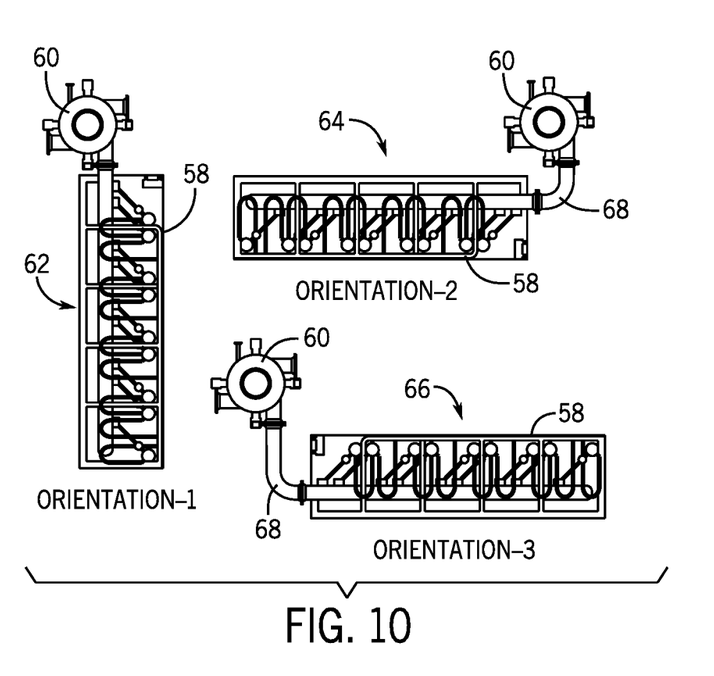
FIG. 10 is a schematic diagram of an embodiment of different orientations of a drain header sub-module coupled to a ADV tank sub-module, in accordance with aspects of the present disclosure.

The pre-defined naming convention 46 still further includes a sub-module orientation 56. The sub-module orientation 56 relates to the orientation of the drain header sub-module (X-axis in FIG. 3 parallel to the drain header pipe centerline) with respect to the vertical centerline of the ADV tank sub-module. The sub-module orientation 56 is derived from a pre-defined orientation convention (e.g., having a finite number of orientations). As depicted in FIG. 10, which shows a drain header submodule 58 coupled to an ADV tank sub-module 60, where three primary choices of orientation 1, 2, and 3 are indicated by reference numerals 62, 64, and 66. With respect to orientation 1 (reference numeral 62), the drain header centerline is parallel to the nozzle axis and the drain header sub-module 58 is directly connected to the nozzle (e.g., drain nozzle B as referenced in FIG. 8) of the ADV tank sub-module 60. With respect to orientation 2 (reference numeral 64) and orientation 3 (reference numeral 66), the drain header sub-module 58 is rotated relative to the ADV tank sub-module 60 using loose supplied elbow piping 68 in a clockwise direction (orientation 2) or a counterclockwise direction (orientation 3). Orientations 1, 2, and 3 may be designated O1, O2, and O3 for the sub-module orientation 56.

Figure 11:
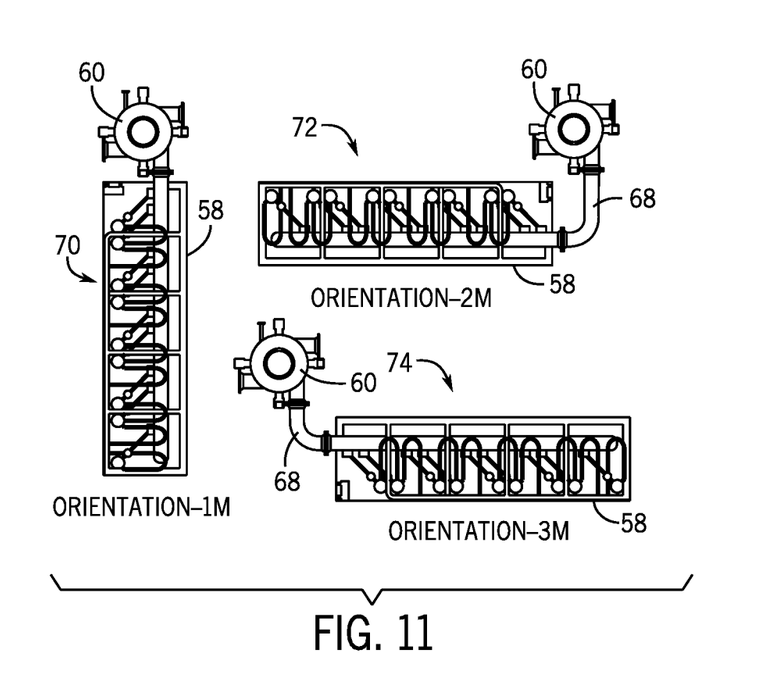
FIG. 11 is a schematic diagram of an embodiment of mirror orientations to the orientations in FIG. 10, in accordance with aspects of the present disclosure.

Three additional orientations, as depicted in FIG. 11, may be available that are the mirror images 1M (reference numeral 70), 2M (reference numeral 72), 3M (reference numeral 74) of the original orientations 1, 2, and 3, respectively. Orientations 1M, 2M, and 3M may be designated 1M, 2M, and 3M for the sub-module orientation 56. For example, the mirror image 70 of orientation 1 has the drain header module 58 mirrored with respect to the drain header centerline so that the small bore drain valves are located on the opposite side of the drain header compared to orientation 1. The mirror image 72 of orientation 2 has the drain header module 58 mirrored with respect to the drain header centerline so that the small bore drain valves are located on the opposite side of the drain header compared to orientation 2. The mirror image 74 of orientation 3 has the drain header module 58 mirrored with respect to the drain header centerline so that the small bore drain valves are located on the opposite side of the drain header compared to orientation 3.

Returning to FIG. 9, the pre-defined naming convention 46 yet further includes a terminal point variation 76. In certain embodiments, the terminal points of the small bore drains may be physically and fully anchored at an outer module boundary (e.g., at one end) of the drain header sub-module. For example, as depicted in FIG. 3, the terminal points of the small bore drains 77 are coupled to physical anchors 78 at an outer boundary of one side 80 of the drain header module 20. Terminal points of small bore drains may be located on one or both sides of the drain header.

Figure 12:
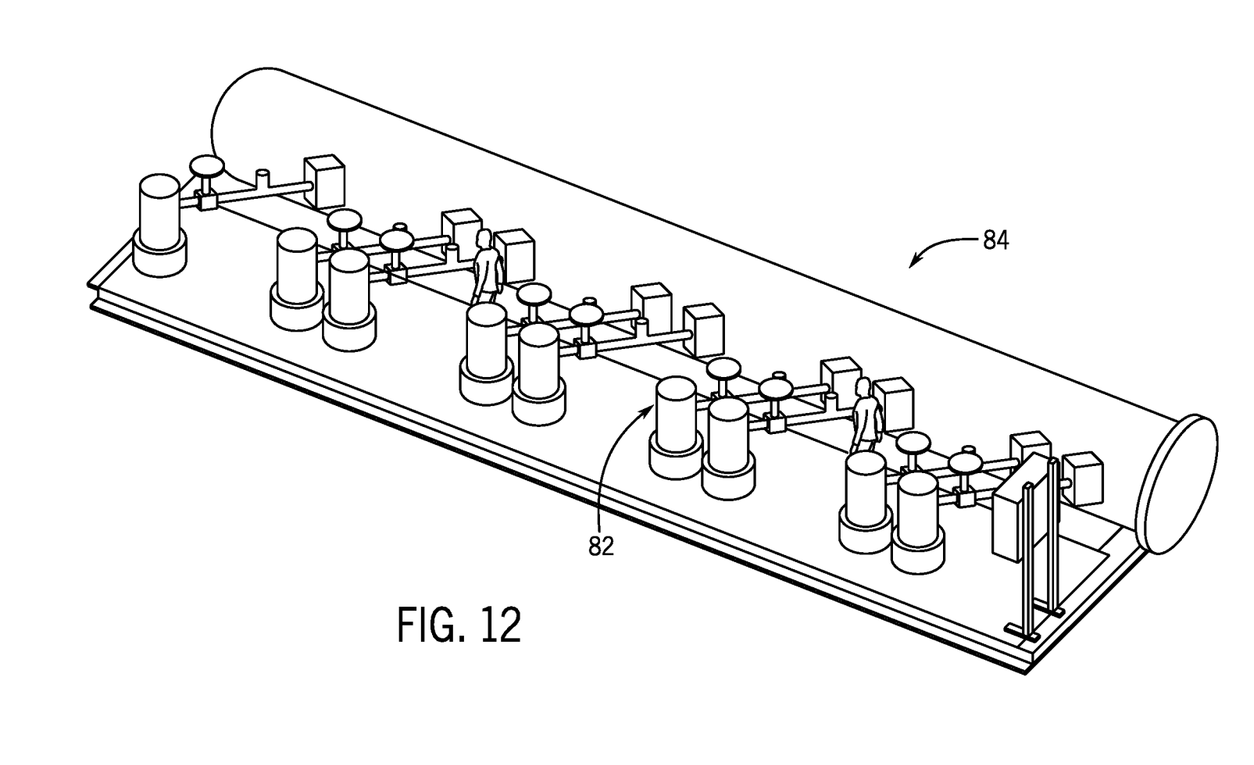
FIG. 12 is a schematic diagram of an embodiment of a drain header sub-module with small bore drains having free terminal points, in accordance with aspects of the present disclosure.

In certain embodiments, a free terminal point option may also be provided for certain pre-engineered sub-modules to provide additional flexibility for installation. For example, as depicted in FIG. 12, the small bore drains 82 of a drain header sub-module 84 have free terminal points (i.e., the small bore drains 82 are not coupled to physical anchors). In certain embodiments, the terminal point variation 70 may be designated 1 or 2 for anchored terminal points on either side of the drain header (1 when the terminal points are located on the same side of the drain header on which the small bore drain valves are located, and 2 when the terminal points are located on the opposite side) and designated F for free terminal points.

The pre-defined naming convention 46 still further includes a train number 86. The sub-module (e.g., drain header sub-module) directly coupled to the ADV tank nozzle is designated 1 for train number 1, and any number of subsequent sub-modules serially connected with the train number 1 is designated as 2, 3, etc. for train numbers 2, 3, etc. depending on the number of trains. If only one sub-module is coupled to the ADV tank nozzle, the designation for train number will be 0.

Figure 13:
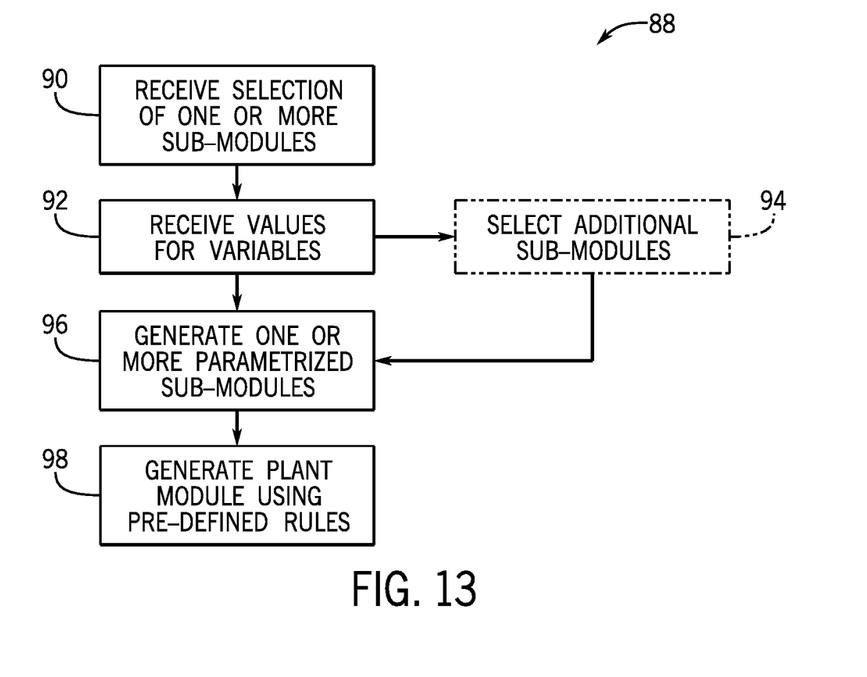
FIG. 13 is a flow diagram of an embodiment of a method for utilizing a modeling system to model components for an area or plant system of a power plant, in accordance with aspects of the present disclosure.

FIG. 13 is a flow diagram of an embodiment of a method 88 for utilizing a modeling system (e.g., modeling system 10 in FIG. 1) to model components (e.g., sub-modules) for an area or plant system (e.g. module or plant module) of a power plant. In certain embodiments, the method 88 may be performed utilizing one or more computing devices as described in FIG. 15. The method 88 may be utilized to model an ADV system as described above or another plant system of the power plant. The method 88 includes receiving (e.g., from a user) an input for selection of one or more pre-engineered sub-modules (e.g., pre-engineered sub-modules 12 in FIG. 1) from a finite number of pre-engineered sub-modules (block 90). The pre-engineered sub-modules are as described above.

The method 88 also includes receiving (e.g., selection or the inputting of the values by the user) values for one or more variables (e.g., variable attributes) within a defined range for each variable (block 92). In certain embodiments, the method 88 includes selecting an additional sub-module of the same or different type to be connected serially with one of the previously selected sub-modules whenever one of the previously selected sub-modules crosses a road-transportable maximum envelop threshold for a given set of independent attributes or variables (block 94). The selection of the additional sub-module may be done automatically, semi-automatically, or manually.

The method 88 further includes generating one more pre-engineered and parametrized sub-modules (e.g., pre-engineered and parametrized sub-modules or final sub-module models 22 in FIG. 1) based on the received values for the one or more variables (block 96). The pre-engineered and parametrized sub-modules are as described above. The method 88 still further includes generating a plant module by applying pre-defined rules to the arrangement of the pre-engineered and parametrized sub-modules (block 98). As noted above, the pre-defined rules may include a pre-defined naming convention and/or a pre-defined orientation convention. The modeling process including the generated sub-modules and plant module may be displayed on a display of a computing device utilizing the modeling system 10.

Figure 14:
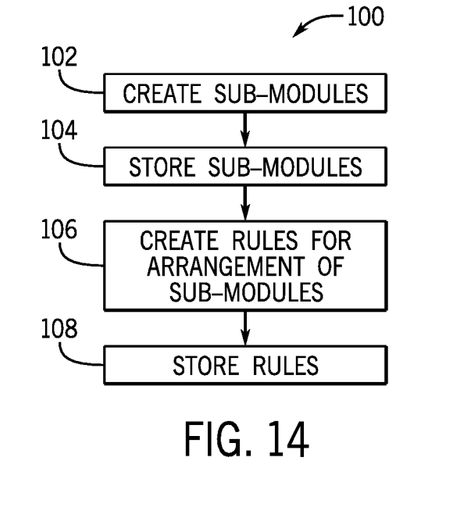
FIG. 14 is a flow diagram of an embodiment of a method for generating a modeling system to model components for an area or plant system of a power plant, in accordance with aspects of the present disclosure.

FIG. 14 is a flow diagram of an embodiment of a method 100 for generating a modeling system (e.g., modeling system 10 in FIG. 1) to model components (e.g., sub-modules) for an area or plant system (e.g. module or plant module) of a power plant. In certain embodiments, the method 100 may be performed utilizing one or more computing devices as described in FIG. 15. The method 100 may be utilized to generate a modeling system for modeling of an ADV system as described above or another plant system of the power plant. One or more steps of the method may be performed simultaneously or in a different order from that depicted in FIG. 14.

The method 100 includes creating or pre-engineering a finite number of sub-modules (block 102). The pre-engineered sub-modules (e.g., pre-engineered sub-modules 12 in FIG. 1) are as described above. The method 100 also includes storing the pre-engineered sub-modules in a memory (e.g., of one or more computing devices) for accessing by a modeling system (e.g., modeling system 10 in FIG. 1) (block 104). The method 100 further includes creating or generating a set of pre-defined rules that enable the arrangement of the pre-engineered sub-modules in a finite number of combinations to form a plant module (e.g., plant module or plant module model 24 in FIG. 1) (block 106). The pre-defined rules may be a pre-defined naming convention and/or a pre-defined orientation convention as described above. The method 100 even further includes storing the pre-defined rules in the memory (e.g., of one or more computing devices) for accessing by a modeling system (e.g., modeling system 10 in FIG. 1) (block 108).

Figure 15:
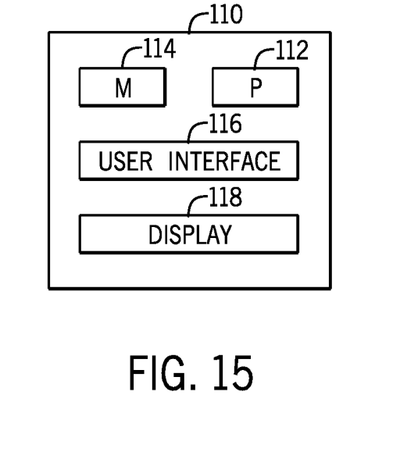
FIG. 15 is a schematic diagram of a computing device for utilizing a modeling system to model components for an area or plant system of a power plant, in accordance with aspects of the present disclosure.

FIG. 15 is a schematic diagram of a computing device 110 for utilizing a modeling system (e.g., modeling system 10 in FIG. 1) to model components for an area or plant system of a power plant. The computing device 110 includes a processor 112 and a memory 114 (e.g., a non-transitory computer-readable medium/memory circuitry) communicatively coupled to the processor 112, storing one or more sets of instructions (e.g., processor-executable instructions) implemented to perform operations related to the modeling system 10 in FIG. 1. More specifically, the memory 114 may include volatile memory, such as random-access memory (RAM), and/or non-volatile memory, such as read-only memory (ROM), optical drives, hard disc drives, or solid-state drives. Additionally, the processor 112 may include one or more application specific integrated circuits (ASICs), one or more field programmable gate arrays (FPGAs), one or more general purpose processors, or any combination thereof. Furthermore, the term "processor" is not limited to just those integrated circuits referred to in the art as processors, but broadly refers to computers, processors, microcontrollers, microcomputers, programmable logic controllers, application specific integrated circuits, and other programmable circuits. The computing device 110 also includes a user interface 116 (e.g., keyboard, mouse, touchscreen, etc.) for receiving user inputs. The computing device 110 further includes a display 118 (e.g., for displaying the modeling of the components of the area or plant system of the power plant).

Technical effects of the disclosed embodiments include providing systems and methods for modeling an area or plant system (e.g., plant system module) for a power plant. For example, the modeling system enables a scalable "building block" approach that enables a full spectrum of class products and plant configurations (and all system variations) to be included in individual sub-modules (e.g., pre-engineered sub-modules) with parametrization features. In addition, the utilization of a limited number of pre-engineered sub-modules minimizes maintenance cost while the limited number of pre-engineered sub-modules are enough to enable a wide range of product and plant configurations. Further, the pre-engineered sub-modules (along with a few loose supplied piping pieces) enable a user to arrange the pre-engineered sub-modules in accordance with the available space and other layout constraints (e.g., customer interfaces) utilizing a pre-defined set of rules (e.g., pre-defined naming convention and/or a pre-defined orientation convention). Even further, the available pre-engineered sub-modules is flexible enough to accommodate a fixed terminal point (e.g., physically anchored) or a free terminal point solution. Still further, the disclosed embodiments (e.g., due to the pre-engineered scalability and the repeatable concept) reduce the amount of time and effort needed to model the area or the plant system for the power plant. Yet further, each sub-module is fully road transportable (even when the largest possible parameters are utilized), thus providing an economic advantage in logistics. In addition, disclosed embodiments provide a savings in terms of site efforts (e.g., installation) and total installed cost.

This written description uses examples to disclose the subject matter, including the best mode, and also to enable any person skilled in the art to practice the subject matter, including making and using any devices or systems and performing any incorporated methods. The patentable scope of the subject matter is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

Further aspects of the invention are provided by the subject matter of the following clauses:

1. A modeling system for a plant system of a power plant, comprising: one or more hardware processors; and a non-transitory memory, the non-transitory memory storing instructions that, when executed by the one or hardware processors, causes the one or more hardware processors to perform actions comprising: receiving a selection of one or more pre-engineered sub-modules from a plurality of pre-engineered sub-modules for a plant system module, wherein each pre-engineered sub-module is configured to be scalable over a defined range both for an entire class product range and each potential power plant configuration, and each pre-engineered sub-module is parametrized within the defined range with a pre-defined parametric relationship; receiving values for one or more variables for the defined range for the one or more pre-engineered sub-modules; generating a pre-engineered and parametrized sub-module model for each of the one or more pre-engineered sub-modules based on the values for the one or more variables; and generating a plant system module model from the pre-engineered and parametrized sub-module models by assembling the pre-engineered and parametrized sub-module models together according to pre-defined rules.

2. The modeling system of any preceding clause, wherein the one or more variables comprise a plurality of independent attributes that vary over the entire class product range and each potential power plant configuration.

3. The modeling system of any preceding clause, wherein the one or more variables comprise a plurality of dependent attributes that define an overall arrangement of each pre-engineered sub-module.

4. The modeling system of any preceding clause, wherein at least some of the plurality of independent attributes and at least some of the plurality of dependent attributes are related to each other via a continuous function.

5. The modeling system of any preceding clause, wherein at least some of the plurality of independent attributes and at least some of the plurality of dependent attributes are related to each other via a step function.

6. The modeling system of any preceding clause, wherein a discrete and unique value for at least one dependent attribute is dependent on values for a set of independent attributes of the plurality of independent attributes.

7. The modeling system of any preceding clause, wherein the pre-defined rules comprise a pre-defined naming convention.

8. The modeling system of any preceding clause, wherein the pre-defined rules comprise a pre-defined number of orientations.

9. The modeling system of any preceding clause, wherein each pre-engineered sub-module within the defined range, when built, is configured for road transportation.

10. The modeling system of any preceding clause, wherein at least one pre-engineered sub-module of the plurality of pre-engineered sub-modules is configured to have all piping for terminal points to be entirely anchored at a boundary for the at least one pre-engineered sub-module so that a configuration of the at least one pre-engineered sub-module is isolated and independent of external factors.

11. The modeling system of any preceding clause, wherein the plant system module comprises an atmospheric drain vessel system.

12. The modeling system of any preceding clause, wherein the plurality of pre-engineered sub-modules comprises a tank sub-module, one or more drain header sub-modules, and a pump sub-module.

13. The modeling system of any preceding clause, wherein the instructions, when executed by the one or hardware processors, cause the one or more hardware processors to automatically or semi-automatically generate a final sub-module model for each of the one or more pre-engineered sub-modules and to automatically or semi-automatically generate the plant system module model.

14. A method for modeling a plant system of a power plant, comprising:
receiving, at a processor, a selection of one or more pre-engineered sub-modules from a plurality of pre-engineered sub-modules for a plant system module, wherein each pre-engineered sub-module is configured to be scalable over a defined range both for an entire class product range and each potential power plant configuration, and each pre-engineered sub-module is parametrized within the defined range with a pre-defined parametric relationship; receiving, at the processor, values for one or more variables for the defined range for the one or more pre-engineered sub-modules; generating, via the processor, a pre-engineered and parametrized sub-module model for each of the one or more pre-engineered sub-modules based on the values for the one or more variables; and generating, via the processor, a plant system module model from the pre-engineered and parametrized sub-module models by assembling the pre-engineered and parametrized sub-module models together according to pre-defined rules.

15. The method of any preceding clause, wherein the one or more variables comprise a plurality of independent attributes that vary over the entire class product range and each potential power plant configuration, and wherein the one or more variables comprise a plurality of dependent attributes that define an overall arrangement of each pre-engineered sub-module.

16. The method of any preceding clause, wherein the pre-defined rules comprise a pre-defined naming convention and a pre-defined number of orientations.

17. The method of any preceding clause, wherein at least one pre-engineered sub-module of the plurality of pre-engineered sub-modules is configured to have all piping for terminal points to be entirely anchored at a boundary for the at least one pre-engineered sub-module so that a configuration of the at least one pre-engineered sub-module is isolated and independent of external factors.

18. The method of any preceding clause, wherein the plant system module comprises an atmospheric drain vessel system, and the plurality of pre-engineered sub-modules comprises a tank sub-module, one or more drain header sub-modules, and a pump sub-module.

19. A non-transitory computer-readable medium, the computer-readable medium comprising processor-executable code that when executed by a processor, causes the processor to: receive a selection of one or more pre-engineered sub-modules from a plurality of pre-engineered sub-modules for a plant system module, wherein each pre-engineered sub-module is configured to be scalable over a defined range both for an entire class product range and each potential power plant configuration, and each pre-engineered sub-module is parametrized to the defined range with a pre-defined parametric relationship; receive values for one or more variables for the defined range for the one or more pre-engineered sub-modules; generate a pre-engineered and parametrized sub-module model for each of the one or more pre-engineered sub-modules based on the values for the one or more variables; and generate a plant system module model from the pre-engineered and parametrized sub-module models by assembling the pre-engineered and parametrized sub-module models together according to pre-defined rules.

20. The non-transitory computer readable storage medium of any preceding clause, wherein the plant system module comprises an atmospheric drain vessel system, and the plurality of pre-engineered sub-modules comprises a tank sub-module, one or more drain header sub-modules, and a pump sub-module.

The invention claimed is:

1. A modeling system for a plant system of a power plant, comprising:
one or more hardware processors; and
a non-transitory memory, the non-transitory memory storing instructions that, when executed by the one or hardware processors, causes the one or more hardware processors to perform actions comprising:
receiving a selection of one or more pre-engineered sub-modules from a plurality of pre-engineered sub-modules for a plant system module, wherein each pre-engineered sub-module is configured to be scalable over a defined range both for an entire class product range and each potential power plant configuration, and each pre-engineered sub-module is parametrized within the defined range with a pre-defined parametric relationship;
receiving values for one or more variables for the defined range for the one or more pre-engineered sub-modules;
generating a pre-engineered and parametrized sub-module model for each of the one or more pre-engineered sub-modules based on the values for the one or more variables; and
generating a plant system module model from the pre-engineered and parametrized sub-module models by assembling the pre-engineered and parametrized sub-module models together according to pre-defined rules.

2. The modeling system of claim 1, wherein the one or more variables comprise a plurality of independent attributes that vary over the entire class product range and each potential power plant configuration.

3. The modeling system of claim 2, wherein the one or more variables comprise a plurality of dependent attributes that define an overall arrangement of each pre-engineered sub-module.

4. The modeling system of claim 3, wherein at least some of the plurality of independent attributes and at least some of the plurality of dependent attributes are related to each other via a continuous function.

5. The modeling system of claim 3, wherein at least some of the plurality of independent attributes and at least some of the plurality of dependent attributes are related to each other via a step function.

6. The modeling system of claim 3, wherein a discrete and unique value for at least one dependent attribute is dependent on values for a set of independent attributes of the plurality of independent attributes.

7. The modeling system of claim 1, wherein the pre-defined rules comprise a pre-defined naming convention.

8. The modeling system of claim 1, wherein the pre-defined rules comprise a pre-defined number of orientations.

9. The modeling system of claim 1, wherein each pre-engineered sub-module within the defined range, when built, is configured for road transportation.

10. The modeling system of claim 1, wherein at least one pre-engineered sub-module of the plurality of pre-engineered sub-modules is configured to have all piping for terminal points to be entirely anchored at a boundary for the at least one pre-engineered sub-module so that a configuration of the at least one pre-engineered sub-module is isolated and independent of external factors.

11. The modeling system of claim 1, wherein the plant system module comprises an atmospheric drain vessel system.

12. The modeling system of claim 11, wherein the plurality of pre-engineered sub-modules comprises a tank sub-module, one or more drain header sub-modules, and a pump sub-module.

13. The modeling system of claim 1, wherein the instructions, when executed by the one or hardware processors, cause the one or more hardware processors to automatically or semi-automatically generate a final sub-module model for each of the one or more pre-engineered sub-modules and to automatically or semi-automatically generate the plant system module model.

14. A method for modeling a plant system of a power plant, comprising:
receiving, at a processor, a selection of one or more pre-engineered sub-modules from a plurality of pre-engineered sub-modules for a plant system module, wherein each pre-engineered sub-module is configured to be scalable over a defined range both for an entire class product range and each potential power plant configuration, and each pre-engineered sub-module is parametrized within the defined range with a pre-defined parametric relationship;
receiving, at the processor, values for one or more variables for the defined range for the one or more pre-engineered sub-modules;
generating, via the processor, a pre-engineered and parametrized sub-module model for each of the one or more pre-engineered sub-modules based on the values for the one or more variables; and
generating, via the processor, a plant system module model from the pre-engineered and parametrized sub-module models by assembling the pre-engineered and parametrized sub-module models together according to pre-defined rules.

15. The method of claim 14, wherein the one or more variables comprise a plurality of independent attributes that vary over the entire class product range and each potential power plant configuration, and wherein the one or more variables comprise a plurality of dependent attributes that define an overall arrangement of each pre-engineered sub-module.

16. The method of claim 14, wherein the pre-defined rules comprise a pre-defined naming convention and a pre-defined number of orientations.

17. The method of claim 14, wherein at least one pre-engineered sub-module of the plurality of pre-engineered sub-modules is configured to have all piping for terminal points to be entirely anchored at a boundary for the at least one pre-engineered sub-module so that a configuration of the at least one pre-engineered sub-module is isolated and independent of external factors.

18. The method of claim 14, wherein the plant system module comprises an atmospheric drain vessel system, and the plurality of pre-engineered sub-modules comprises a tank sub-module, one or more drain header sub-modules, and a pump sub-module.

19. A non-transitory computer-readable medium, the computer-readable medium comprising processor-executable code that when executed by a processor, causes the processor to:
receive a selection of one or more pre-engineered sub-modules from a plurality of pre-engineered sub-modules for a plant system module, wherein each pre-engineered sub-module is configured to be scalable over a defined range both for an entire class product range and each potential power plant configuration, and each pre-engineered sub-module is parametrized to the defined range with a pre-defined parametric relationship;
receive values for one or more variables for the defined range for the one or more pre-engineered sub-modules;
generate a pre-engineered and parametrized sub-module model for each of the one or more pre-engineered sub-modules based on the values for the one or more variables; and
generate a plant system module model from the pre-engineered and parametrized sub-module models by assembling the pre-engineered and parametrized sub-module models together according to pre-defined rules.

20. The non-transitory computer readable storage medium of claim 19, wherein the plant system module comprises an atmospheric drain vessel system, and the plurality of pre-engineered sub-modules comprises a tank sub-module, one or more drain header sub-modules, and a pump sub-module.

* * * * *